United States Patent Office 3,045,024
Patented July 17, 1962

3,045,024
HYDROXYALKYLPYRIDINETHIONAMIDES
Francis E. Cislak, Indianapolis, Ind., assignor to Reilly Tar & Chemical Corporation, Indianapolis, Ind., a corporation of Indiana
No Drawing. Filed Feb. 3, 1961, Ser. No. 86,857
6 Claims. (Cl. 260—294.8)

This invention relates to new chemical compounds and to the process of making them. More particularly, it relates to hydroxyalkylpyridine-thionamides having the following structural formula:

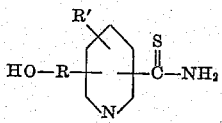

wherein R is a lower alkyl group and R' is lower alkyl or hydrogen.

In general the compounds of my invention may be prepared by the reaction of a cyanoalkanolpyridine with ammonium sulfide. The equation below portrays the formation of 4-hydroxypropyl-2-pyridine-thionamide from 4-hydroxypropyl-2-cyanopyridine.

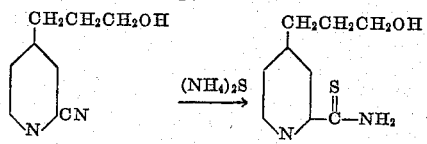

Illustrative of the manner in which my invention may be practiced, I cite the following examples:

EXAMPLE 1

4-Hydroxypropyl-2-Pyridine-Thionamide

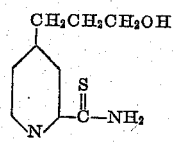

100 grams of 2-cyano-4-hydroxypropylpyridine is dissolved in 1,000 grams of 30% ammoniacal methanol. The resulting solution is saturated with dry $H_2S$ at 25° C. and then permitted to stand at room temperature for about two days. The 4-hydroxypropyl-2-pyridine-thionamide formed during this time is recovered in any convenient manner. One way of recovering the pyridine-thionamide is to evaporate the methanol under vacuum. The 4-hydroxypropyl-2-pyridine-thionamide remaining is pure enough for most purposes. If a purer product is desired, the above obtained thionamide may be dissolved in a suitable solvent, such as acetone, pyridine, etc., treated with decolorizing carbon and hot filtered, the filtrate cooled to about 25° C., and the pure 4-hydroxypropyl-2-pyridine-thionamide recovered from the cooled filtrate.

EXAMPLE 2

2-Hydroxyethyl-4-Pyridine-Thionamide

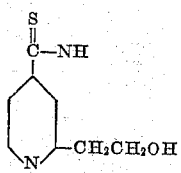

The procedure of Example 1 is repeated with the exception that 2-hydroxyethyl-4-cyanopyridine is used in place of the 2-cyano-4-hydroxypropylpyridine.

EXAMPLE 3

3-(Alpha-Hydroxyethyl)-5-Pyridine-Thionamide

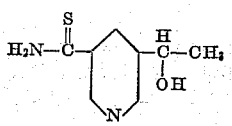

The procedure of Example 1 is repeated with the exception that 3-(alpha-hydroxyethyl)-5-cyanopyridine is used in place of the 2-cyano-4-hydroxypropylpyridine.

EXAMPLE 4

3-Hydroxymethyl-2-Pyridine-Thionamide

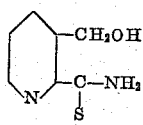

The procedure of Example 1 is repeated with the exception that 3-hydroxymethyl-2-cyanopyridine is used in place of the 2-cyano-4-hydroxypropylpyridine.

EXAMPLE 5

2-Hydroxyethyl-5-Ethyl-6-Pyridine-Thionamide

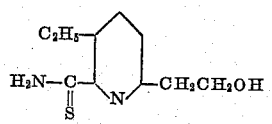

The procedure of Example 1 is repeated with the exception that 2-hydroxyethyl-5-ethyl-6 cyanopyridine is used in place of the 2-cyano-4-hydroxypropylpyridine.

EXAMPLE 6

4-(Gamma-Hydroxybutyl)-2-Pyridine-Thionamide

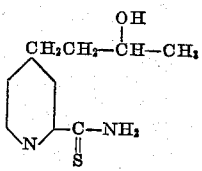

The procedure of Example 1 is repeated with the exception that 2-cyano-4-(gamma-hydroxybutyl)pyridine is used in place of the 2-cyano-4-hydroxypropylpyridine.

EXAMPLE 7

6-Hydroxyethyl-2-Pyridine-Thionamide

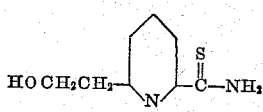

The procedure of Example 1 is repeated with the exception that 2-cyano-6-hydroxyethylpyridine is used in place of the 2-cyano-4-hydroxypropylpyridine.

The range of uses to which my hydroxyalkylpyridine thionamides may be put is very broad. They may be used in such diversified fields as metal deactivators in petroleum products, vulcanization accelerators, in the preparation of pharmaceuticals, fungicides, herbicides, and bactericides. Some of them, such as 2-hydroxyethyl-4-pyridine-thionamides may be useful anti-tubercular compounds.

My hydroxyalkylpyridine-thionamides are useful in controlling the action of non-oxidizing inorganic acids upon metals. A 5% solution of my hydroxyalkylpyridine-thionamides in high boiling coal tar bases is particularly useful in inhibiting the action of dilute aqueous sulfuric acid upon steel.

I claim as my invention:

1. Hydroxyalkylpyridinethionamides having the formula:

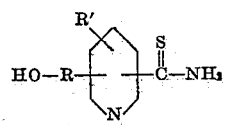

wherein R is lower alkyl and R' is selected from the group consisting of hydrogen and lower alkyl.

2. The compound 2-hydroxyethyl-4-pyridine-thionamide.

3. The compound 4-hydroxypropyl-2-pyridine-thionamide.

4. The compound 3-hydroxymethyl-2-pyridine-thionamide.

5. The compound 6-hydroxyethyl-2-pyridine-thionamide.

6. The compound 2-hydroxyethyl-5-ethyl-6-pyridine-thionamide.

References Cited in the file of this patent
UNITED STATES PATENTS
2,653,942    Lee ------------------ Sept. 29, 1953
FOREIGN PATENTS
800,250    Great Britain ----------- Aug. 20, 1958
OTHER REFERENCES
Whitmore: "Organic Chemistry," 2nd Ed., page 415 (1951) (Van Nostrand).